(12) United States Patent
Ekstrand et al.

(10) Patent No.: US 9,012,378 B2
(45) Date of Patent: *Apr. 21, 2015

(54) APPARATUS, COMPOSITIONS, AND METHODS OF BREAKING FRACTURING FLUIDS

(76) Inventors: Barry Ekstrand, Katy, TX (US); Frank Zamora, San Antonio, TX (US); Sarkis R. Kakadjian, San Antonio, TX (US)

(*) Notice: Subject to any disclaimer, the term of this patent is extended or adjusted under 35 U.S.C. 154(b) by 277 days.

This patent is subject to a terminal disclaimer.

(21) Appl. No.: 13/079,081

(22) Filed: Apr. 4, 2011

(65) Prior Publication Data

US 2011/0177982 A1 Jul. 21, 2011

Related U.S. Application Data

(62) Division of application No. 12/116,072, filed on May 6, 2008, now Pat. No. 7,942,201.

(60) Provisional application No. 60/917,598, filed on May 11, 2007.

(51) Int. Cl.
| | |
|---|---|
| *C09K 8/60* | (2006.01) |
| *E21B 43/22* | (2006.01) |
| *E21B 43/16* | (2006.01) |
| *E21B 43/26* | (2006.01) |
| *C09K 8/68* | (2006.01) |

(52) U.S. Cl.
CPC .............. *C09K 8/685* (2013.01); *Y10S 507/921* (2013.01); *Y10S 507/902* (2013.01)

(58) Field of Classification Search
USPC ................. 507/201; 166/246, 305.1
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |

(Continued)

FOREIGN PATENT DOCUMENTS

| | | | |
|---|---|---|---|
| CA | 2125513 | 1/1995 | C10L 3/10 |
| CA | 2007965 | 2/1996 | C10G 29/20 |

(Continued)

OTHER PUBLICATIONS

U.S. Appl. No. 12/075,461, filed Mar. 11, 2008, Gatlin et al.
U.S. Appl. No. 11/554,834, filed Oct. 31, 2006, Venditto et al.
U.S. Appl. No. 11/765,306, filed Jun. 19, 2007, Kakadjian et al.

(Continued)

*Primary Examiner* — Susannah Chung
*Assistant Examiner* — Atnaf Admasu
(74) *Attorney, Agent, or Firm* — Robert W Strozier

(57) ABSTRACT

Apparatus and compositions for reducing the viscosity of a gelled fluid is provided. In one embodiment, a viscosity reducing microbe is disposed in a capsule and added to the gelled fluid. The gelled fluid may include a thickening agent adapted to increase its viscosity. Upon release from the capsule, the microbe begins to digest the thickening agent in the gelled fluid and/or releases enzymes that that breakdown the thickening agent.

30 Claims, 6 Drawing Sheets

Changes in Viscosity of an Guar Gelled Fluid pH 7

(56) References Cited

U.S. PATENT DOCUMENTS

| | | | | |
|---|---|---|---|---|
| 3,888,312 A | 6/1975 | Tiner et al. | | 166/308.5 |
| 3,933,205 A | 1/1976 | Kiel | | 166/308.1 |
| 3,937,283 A | 2/1976 | Blauer et al. | | 166/307 |
| 3,960,736 A | 6/1976 | Free et al. | | 507/216 |
| 3,965,982 A | 6/1976 | Medlin | | 166/249 |
| 3,990,978 A | 11/1976 | Hill | | 507/235 |
| 4,007,792 A | 2/1977 | Meister | | 166/308.2 |
| 4,052,159 A | 10/1977 | Fuerst et al. | | |
| 4,067,389 A | 1/1978 | Savins | | 166/246 |
| 4,108,782 A | 8/1978 | Thompon | | 507/205 |
| 4,112,050 A | 9/1978 | Sartori et al. | | 423/223 |
| 4,112,051 A | 9/1978 | Sartori et al. | | 423/223 |
| 4,112,052 A | 9/1978 | Sartori et al. | | 423/223 |
| 4,113,631 A | 9/1978 | Thompson | | 507/202 |
| 4,378,845 A | 4/1983 | Medlin et al. | | 166/297 |
| 4,461,716 A | 7/1984 | Barbarin et al. | | 252/307 |
| 4,479,041 A | 10/1984 | Fenwick et al. | | 200/81 R |
| 4,506,734 A | 3/1985 | Nolte | | 166/308.1 |
| 4,514,309 A | 4/1985 | Wadhwa | | 507/211 |
| 4,541,935 A | 9/1985 | Constien et al. | | 507/225 |
| 4,549,608 A | 10/1985 | Stowe et al. | | 166/280.1 |
| 4,561,985 A | 12/1985 | Glass, Jr. | | 507/108 |
| 4,623,021 A | 11/1986 | Stowe | | 166/250.1 |
| 4,654,266 A | 3/1987 | Kachnik | | 428/403 |
| 4,657,081 A | 4/1987 | Hodge | | 166/380.5 |
| 4,660,643 A | 4/1987 | Perkins | | 166/283 |
| 4,683,068 A | 7/1987 | Kucera | | 507/201 |
| 4,686,052 A | 8/1987 | Baranet et al. | | 507/244 |
| 4,695,389 A | 9/1987 | Kubala | | 507/244 |
| 4,705,113 A | 11/1987 | Perkins | | 166/302 |
| 4,714,115 A | 12/1987 | Uhri | | 166/308.1 |
| 4,718,490 A | 1/1988 | Uhri | | 166/281 |
| 4,724,905 A | 2/1988 | Uhri | | 166/250.1 |
| 4,725,372 A | 2/1988 | Teot et al. | | 507/129 |
| 4,739,834 A | 4/1988 | Peiffer et al. | | 166/308.4 |
| 4,741,401 A | 5/1988 | Walles et al. | | 166/300 |
| 4,748,011 A | 5/1988 | Baize | | 423/228 |
| 4,779,680 A | 10/1988 | Sydansk | | 166/300 |
| 4,795,574 A | 1/1989 | Syrinek et al. | | 507/238 |
| 4,817,717 A | 4/1989 | Jennings, Jr. et al. | | 166/278 |
| 4,830,106 A | 5/1989 | Uhri | | 166/250.1 |
| 4,846,277 A | 7/1989 | Khalil et al. | | 166/280.1 |
| 4,848,468 A | 7/1989 | Hazlett et al. | | 166/300 |
| 4,852,650 A | 8/1989 | Jennings, Jr. et al. | | 166/250.1 |
| 4,869,322 A | 9/1989 | Vogt, Jr. et al. | | 166/280.1 |
| 4,892,147 A | 1/1990 | Jennings, Jr. et al. | | 166/280.2 |
| 4,926,940 A | 5/1990 | Stromswold | | 166/247 |
| 4,938,286 A | 7/1990 | Jennings, Jr. | | 166/280.1 |
| 4,978,512 A | 12/1990 | Dillon | | 423/226 |
| 5,005,645 A | 4/1991 | Jennings, Jr. et al. | | 166/280.1 |
| 5,024,276 A | 6/1991 | Borchardt | | 166/308.6 |
| 5,067,556 A | 11/1991 | Fudono et al. | | 62/196.4 |
| 5,074,359 A | 12/1991 | Schmidt | | 166/280.1 |
| 5,074,991 A | 12/1991 | Weers | | 208/236 |
| 5,082,579 A | 1/1992 | Dawson | | 507/211 |
| 5,106,518 A | 4/1992 | Cooney et al. | | 507/21 |
| 5,110,486 A | 5/1992 | Manalastas et al. | | 507/260 |
| 5,169,411 A | 12/1992 | Weers | | 44/421 |
| 5,224,546 A | 7/1993 | Smith et al. | | 166/300 |
| 5,228,510 A | 7/1993 | Jennings, Jr. et al. | | 166/263 |
| 5,246,073 A | 9/1993 | Sandiford et al. | | 166/295 |
| 5,259,455 A | 11/1993 | Nimerick et al. | | 166/308.5 |
| 5,330,005 A | 7/1994 | Card et al. | | 166/280.2 |
| 5,336,431 A | 8/1994 | Richards et al. | | |
| 5,342,530 A | 8/1994 | Aften et al. | | 252/8.551 |
| 5,347,004 A | 9/1994 | Rivers et al. | | 544/180 |
| 5,363,919 A | 11/1994 | Jennings, Jr. | | 166/308.1 |
| 5,402,846 A | 4/1995 | Jennings, Jr. et al. | | 166/259 |
| 5,411,091 A | 5/1995 | Jennings, Jr. | | 166/280.1 |
| 5,424,284 A | 6/1995 | Patel et al. | | 507/129 |
| 5,439,055 A | 8/1995 | Card et al. | | 166/280.2 |
| 5,462,721 A | 10/1995 | Pounds et al. | | 423/226 |
| 5,465,792 A | 11/1995 | Dawson et al. | | 166/295 |
| 5,472,049 A | 12/1995 | Chaffee et al. | | 166/250.1 |
| 5,482,116 A | 1/1996 | El-Rabaa et al. | | 166/250.1 |
| 5,488,083 A | 1/1996 | Kinsey, III et al. | | 507/211 |
| 5,497,831 A | 3/1996 | Hainey et al. | | 166/308.1 |
| 5,501,275 A | 3/1996 | Card et al. | | 166/280.2 |
| 5,551,516 A | 9/1996 | Norman et al. | | 166/308.2 |
| 5,624,886 A | 4/1997 | Dawson et al. | | 507/217 |
| 5,635,458 A | 6/1997 | Lee et al. | | 507/240 |
| 5,649,596 A | 7/1997 | Jones et al. | | 166/300 |
| 5,669,447 A | 9/1997 | Walker et al. | | 166/300 |
| 5,674,377 A | 10/1997 | Sullivan, III et al. | | 208/208 R |
| 5,688,478 A | 11/1997 | Pounds et al. | | 423/228 |
| 5,693,837 A | 12/1997 | Smith et al. | | 556/148 |
| 5,711,396 A | 1/1998 | Joerg et al. | | 180/444 |
| 5,722,490 A | 3/1998 | Ebinger | | 166/281 |
| 5,744,024 A | 4/1998 | Sullivan, III et al. | | 208/236 |
| 5,755,286 A | 5/1998 | Ebinger | | 166/281 |
| 5,775,425 A | 7/1998 | Weaver et al. | | 166/276 |
| 5,787,986 A | 8/1998 | Weaver et al. | | 166/280.2 |
| 5,806,597 A | 9/1998 | Tjon-Joe-Pin et al. | | 166/300 |
| 5,807,812 A | 9/1998 | Smith et al. | | 507/238 |
| 5,833,000 A | 11/1998 | Weaver et al. | | 166/276 |
| 5,853,048 A | 12/1998 | Weaver et al. | | 166/279 |
| 5,871,049 A | 2/1999 | Weaver et al. | | 166/276 |
| 5,877,127 A | 3/1999 | Card et al. | | 507/273 |
| 5,908,073 A | 6/1999 | Nguyen et al. | | 166/276 |
| 5,908,814 A | 6/1999 | Patel et al. | | 507/131 |
| 5,964,295 A | 10/1999 | Brown et al. | | 166/308.2 |
| 5,979,557 A | 11/1999 | Card et al. | | 166/300 |
| 5,980,845 A | 11/1999 | Cherry | | 423/229 |
| 6,016,871 A | 1/2000 | Burts, Jr. | | 166/300 |
| 6,035,936 A | 3/2000 | Whalen | | 166/308.5 |
| 6,047,772 A | 4/2000 | Weaver et al. | | 166/276 |
| 6,054,417 A | 4/2000 | Graham et al. | | 507/238 |
| 6,059,034 A | 5/2000 | Rickards et al. | | 166/280.2 |
| 6,060,436 A | 5/2000 | Snyder et al. | | 507/266 |
| 6,069,118 A | 5/2000 | Hinkel et al. | | 507/277 |
| 6,123,394 A | 9/2000 | Jeffrey | | 299/16 |
| 6,133,205 A | 10/2000 | Jones | | 507/276 |
| 6,147,034 A | 11/2000 | Jones et al. | | 507/238 |
| 6,162,449 A | 12/2000 | Maier et al. | | 424/401 |
| 6,162,766 A | 12/2000 | Muir et al. | | 507/267 |
| 6,169,058 B1 | 1/2001 | Le et al. | | 507/222 |
| 6,228,812 B1 | 5/2001 | Dawson et al. | | 507/221 |
| 6,247,543 B1 | 6/2001 | Patel et al. | | 175/64 |
| 6,267,938 B1 | 7/2001 | Warrender et al. | | 423/226 |
| 6,283,212 B1 | 9/2001 | Hinkel et al. | | 166/279 |
| 6,291,405 B1 | 9/2001 | Lee et al. | | 507/136 |
| 6,330,916 B1 | 12/2001 | Rickards et al. | | 166/280.2 |
| 6,725,931 B2 | 4/2004 | Nguyen et al. | | 166/280.2 |
| 6,756,345 B2 | 6/2004 | Pakulski et al. | | 507/246 |
| 6,793,018 B2 | 9/2004 | Dawson et al. | | 166/300 |
| 6,818,594 B1 * | 11/2004 | Freeman et al. | | 507/101 |
| 6,832,650 B2 | 12/2004 | Nguyen et al. | | 166/279 |
| 6,875,728 B2 | 4/2005 | Gupta et al. | | 507/240 |
| 7,140,433 B2 | 11/2006 | Gatlin et al. | | 166/250.01 |
| 7,268,100 B2 | 9/2007 | Kippie et al. | | 507/244 |
| 7,350,579 B2 | 4/2008 | Gatlin et al. | | 166/308.3 |
| 2002/0049256 A1 | 4/2002 | Bergeron, Jr. | | 514/674 |
| 2002/0165308 A1 | 11/2002 | Kinniard et al. | | 524/492 |
| 2003/0220204 A1 | 11/2003 | Baran, Jr. et al. | | 507/200 |
| 2005/0045330 A1 | 3/2005 | Nguyen et al. | | 166/281 |
| 2005/0092489 A1 | 5/2005 | Welton et al. | | 166/280.2 |
| 2005/0137114 A1 | 6/2005 | Gatlin et al. | | 510/424 |
| 2005/0153846 A1 | 7/2005 | Gatlin | | 208/236 |
| 2005/0250666 A1 | 11/2005 | Gatlin et al. | | 510/492 |
| 2006/0194700 A1 | 8/2006 | Gatlin et al. | | 507/203 |
| 2007/0032693 A1 | 2/2007 | Gatlin et al. | | 507/239 |
| 2007/0129257 A1 | 6/2007 | Kippie et al. | | 507/102 |
| 2007/0131425 A1 | 6/2007 | Gatlin et al. | | 166/280.2 |
| 2007/0173413 A1 | 7/2007 | Lukocs et al. | | 507/238 |
| 2007/0173414 A1 | 7/2007 | Wilson, Jr. | | 507/131 |
| 2008/0039345 A1 | 2/2008 | Kippie et al. | | 507/213 |

FOREIGN PATENT DOCUMENTS

| | | | |
|---|---|---|---|
| DE | 4027300 | 5/1992 | B10D 53/14 |
| EP | 0730018 A1 | 9/1996 | C09K 7/02 |

(56) References Cited

FOREIGN PATENT DOCUMENTS

| | | | |
|---|---|---|---|
| GB | 775376 | 10/1954 | |
| GB | 816337 A | 7/1959 | |
| GB | 1073338 A | 6/1967 | |
| JP | 10001461 | 6/1988 | ............ C07C 211/50 |
| JP | 08151422 | 11/1996 | ............ C08G 12/08 |
| JP | 10110115 A | 4/1998 | |
| JP | 2005194148 A | 7/2005 | |
| WO | WO 98/56497 | 12/1998 | ................ B01F 7/00 |

OTHER PUBLICATIONS

U.S. Appl. No. 11/748,248, filed May 14, 2007, Thompson et al.
U.S. Appl. No. 11/736,971, filed Apr. 18, 2007, Kippie et al.
U.S. Appl. No. 11/767,384, filed Jun. 22, 2007, Sweeney et al.
U.S. Appl. No. 11/741,110, filed Apr. 27, 2007, Wilson, Jr. et al.
U.S. Appl. No. 11/677,434, filed Feb. 21, 2007, Wanner et al.
U.S. Appl. No. 11/736,992, filed Apr. 18, 2007, Zamora et al.
U.S. Appl. No. 11/760,581, filed Jun. 8, 2007, Schwartz.
U.S. Appl. No. 12/029,335, filed Feb. 11, 2008, Kakadjian et al.

* cited by examiner

APPARATUS, COMPOSITIONS, AND METHODS OF BREAKING FRACTURING FLUIDS

RELATED APPLICATIONS

This application is a divisional of, claims priority to, and the benefit of United State patent application Ser. No. 12/116,072, filed 6 May 2008 now U.S. Pat. No. 7,942,201 issued 17 May 2011, which claims priority to and the benefit of U.S. Provisional Patent Application Ser. No. 60/917,598 filed 11 May 2007.

BACKGROUND OF THE INVENTION

1. Field of the Invention

The present invention relates to apparatus and methods of breaking fracturing fluids.

More particularly, the present invention relates to apparatus and methods of breaking fracturing fluids, where the method includes that step of supplying a composition to a fracturing fluid prior to or after initial fracturing, where the composition includes a microbial agent capable of digesting or converting a gelled component of the fracturing fluid into low molecular components resulting in a "breaking" of the viscosity of the fracturing fluid over a set and controllable period of time and to compositions and methods for making the compositions.

2. Description of the Related Art

Most wells are hydraulically fractured to increase flow. The rheological requirements of a fracturing fluid are highly constraining. To adequately propagate fractures in the subterranean formation, the fracturing fluid is designed to have properties such as body, viscosity, etc. sufficient to form fractures in the formation without leaking excessively into the formation, when the fracturing fluid is forced into the formation at elevated pressures. Also, a fracturing fluid is designed to have the capability to transport and deposit large volumes of proppant into the fractures or cracks in the formation formed during fracturing. After the fracturing operation is complete and pressure on the fluid is released, the fracturing fluid is designed to readily flow back into the well and not leave significant residues in the fractures that impair permeability of the formation and conductivity of fluids into and out of the fractures. Finally, a fracturing fluid is designed to have rheological characteristics which permit it to be formulated on the surface with reasonable convenience and to be pumped down the well without excessive difficulty or pressure drop frictional losses.

The most commonly used fracturing fluids are water-based compositions containing a water soluble hydratable high molecular weight polymer, which increases the viscosity of the fluid by forming a gel when it dissolves in the fluid. Thickening the fluid reduces leakage of liquids from the fracturing fluid into the formation during fracturing and increases proppant suspension capability.

In some fracturing fluid formulations, chemical agents are added to crosslink the polymer viscosifier molecules to further increase fluid viscosity. Cross-linking increases fluid viscosity by forming interpolymer chemical bonds.

When the fracturing operation is complete, the pressure of the fracturing fluid in the formation is reduced. Fracturing fluid flows back out of the formation into the well. Fracturing fluids are designed to flow quickly and completely out of the formation and back into the well to allow production of hydrocarbons. Although hydratable polymers naturally decompose over time, these natural degradation processes are generally too slow resulting in too great of a loss of production time if producers were required to wait for natural degradation processes to break the fracturing fluid viscosity. To enhance back flow of fracturing fluid out of the formation and into the well, compounds are added to the fluid (initially or subsequent to fracturing) to reduce or "break" the viscosity of the fracturing fluid so that the fluid can flow more freely and be removed from the formation into the well more quickly.

Fracturing fluid viscosity breaking also is utilized to minimize damage to the formation. As the fracturing operation proceeds, the thickening agents in the fracturing fluid can form a thin film over the fracture face which is referred to as a "filter-cake." Excessive filter cakes can imped the flow of production fluids from the formation into the well.

It has been reported in the literature that enzymes can be used to degrade drilling fluid residues. For example, Hanssen, et al., "New Enzyme Process for Downhole Cleanup of Reservoir Drilling Filter cake" SPE 50709 (1999) disclosed experimental work towards the use of enzymes for downhole cleanup of filter cakes produced by water-based drilling fluids.

U.S. Pat. No. 5,247,995 (incorporated herein by reference) disclosed method of degrading damaging material within a subterranean formation of a well bore using an enzyme treatment. Filter cakes and very viscous fluids are such damaging materials. The enzyme treatment degrades polysaccharide-containing filter cakes and damaging fluids which reduces their viscosity. The degraded filter cake and damaging fluid can then be removed from the formation back to the well surface. The particular enzymes utilized are specific to a particular type of polysaccharide and are active at low to moderate temperatures. The enzymes attack only specific linkages in filter cakes and damaging fluids and are active in the pH range of about 2.0 to 10.0.

Simply adding the enzymes to the fluid may lead to premature breaking of the fluid. U.S. Pat. No. 5,437,331 disclosed a method of fracturing a subterranean formation in a well bore is shown in which a gellable fracturing fluid is first formed by blending together an aqueous fluid, a hydratable polymer, a suitable cross-linking agent for cross-linking the hydratable polymer to form a polymer gel and an encapsulated enzyme breaker. The cross-linked polymer gel is pumped into the well bore under sufficient pressure to fracture the surrounding formation. The encapsulated enzyme breaker is allowed to degrade the cross-linked polymer with time to reduce the viscosity of the fluid so that the fluid can be pumped from the formation back to the well surface. The particular enzyme breaker uses open cellular encapsulation to protect and delay the action of the enzyme.

Although enzyme type breakers have been used, there use has been limited do to release dynamics and duration of activity, there is still a need in the art for compositions and methods of breaking a fracturing fluid in a controlled manner over a controlled or designed period of time.

DEFINITIONS OF THE INVENTION

The following definitions are provided in order to aid those skilled in the art in understanding the detailed description of the present invention.

The term "surfactant" refers to a soluble, or partially soluble compound that reduces the surface tension of liquids, or reduces inter-facial tension between two liquids, or a liquid and a solid by congregating and orienting itself at these interfaces.

The term "amphoteric" refers to surfactants that have both positive and negative charges. The net charge of the surfactant can be positive, negative, or neutral, depending on the pH of the solution.

The term "anionic" refers to those surfactants that possess a net negative charge.

The term "cationic" refers to those surfactants that possess a net positive charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.

SUMMARY OF THE INVENTION

The present invention provides apparatuses and methods for reducing a viscosity of a gelled fluid and degrading filter cake formed by the fluid. In one embodiment, a viscosity reducing microbe is disposed in a capsule and added to the gelled fluid. The gelled fluid may include a thickening agent adapted to increase its viscosity. The capsule containing the microbe is designed to rupture releasing the microbe at a designated time. Once released, the microbe and/or enzymes produced by the microbe begin to digest or breakdown the thickening agent in the gelled fluid into low molecular weight materials. This breakdown breaks the viscosity of the gelled fluid in a controlled manner.

The present invention also provides a method for reducing a viscosity of a gelled fluid, where the method comprises forming a gelled fluid. The method also includes the step of adding an effective amount of a viscosity reducing microbe sufficient to reduce the viscosity of the gelled fluid to a desired lower viscosity in a controlled manner.

The present invention also provides a method for reducing a viscosity of a gelled fluid, where the method comprises forming a gelled fluid. The method also includes the step of adding an effective amount of an encapsulated viscosity reducing microbe sufficient to reduce the viscosity of the gelled fluid. The method also includes the step of releasing the microbe in a controlled manner based on the breakdown of the encapsulating agent either due to a change in temperature, exposure to an aqueous fluid, a changed pH, a change in pressure, a change in shear, the addition of an additive designed to remove or destory the encapsulating agent, or a combination of some or all of these deencapsulating condition. The method also includes the step of exposing the viscosity reducing microbe to the gelled fluid as it is released from the encapsulating agent, where the released microbe and/or enzymes produced by the microbe to reduce the viscosity of the gelled fluid in a controlled manner.

The present invention also provides a method for reducing a viscosity of a gelled fluid, where the method comprises forming a gelled fluid. The method also includes the step of adding an effective amount of a mixture of a microbe and/or an encapsulated viscosity reducing microbe sufficient to reduce the viscosity of the gelled fluid, where the non-encapsulated microbe begins viscosity breakdown and encapsulated microbe deencapsulates to change the viscosity breakdown dynamics. By changing the mixture of a microbe composition and an encapsulated microbe composition, the viscosity of the mixture can be tailored to achieve a desired and controlled viscosity breakdown of a gelled fluid. In certain embodiments, the microbe compositions can be combined with traditional breakers to further augment and control the viscosity breakdown dynamics.

The present invention also provides an apparatus for reducing viscosity of a gelled fluid includes a capsule and a viscosity reducing microbe disposed within the capsule, wherein the capsule is adapted to release the viscosity reducing microbe into a gelled fluid over time.

The present invention provides an apparatus for reducing viscosity of a gelled fluid includes a capsule and a viscosity reducing microbe disposed within the capsule, wherein the capsule is adapted to delay a release of the microbe to control the onset of the viscosity breakdown.

The present invention provides a fluid composition for wellbore operations includes an aqueous fluid; a fluid thickener; and a capsule containing a viscosity reducing microbe, wherein the viscosity reducing microbe is adapted to degrade the fluid thickener upon contact therewith in a controlled manner.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
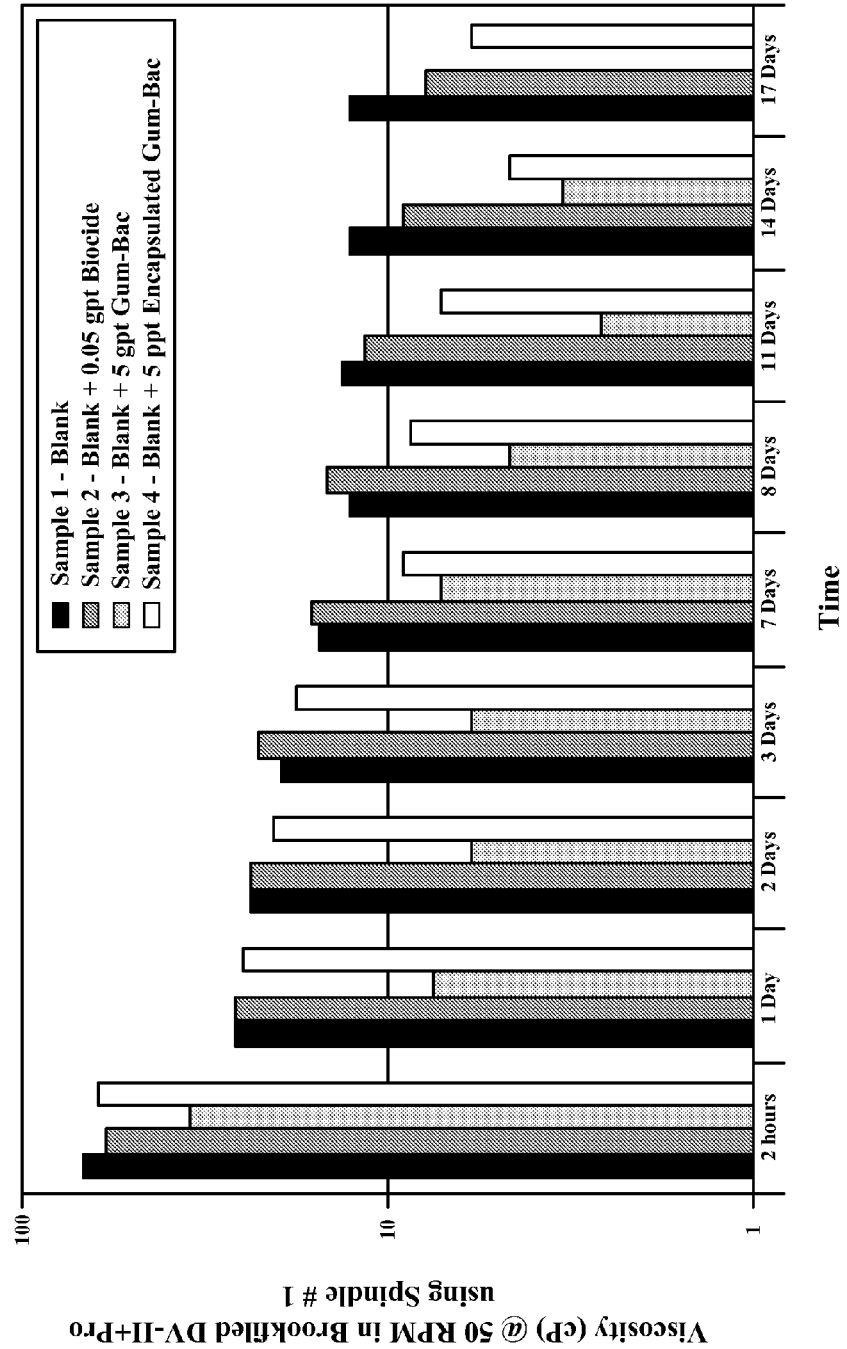
FIG. 1 shows the results of the viscosity reducing effects of an embodiment of a microbial composition, in an unencapsulated and encapsulated form at pH 7.

The inventors have found apparatuses, compositions and methods can be implemented to break a viscosity of a gelled fluid, especially, gelled fracturing fluids. The apparatuses, compositions and methods all involve the use of a gelled fluid capable of being viscosity reduced due to the action of a microbe and/or enzymes produces by the microbe, when the microbial composition is brought in contact with a gelled fluid. The inventors have found that the amount and form of the microbial composition can be tailored to achieve a given rate of viscosity breakdown and/or a given viscosity breakdown profile.

Embodiments of the present invention provide apparatus and methods of reducing the viscosity of a gelled fluid. In one embodiment, a viscosity reducing microbe is disposed in a capsule and added to the gelled fluid. The gelled fluid may include a thickening agent adapted to increase its viscosity. Upon release from the capsule, the microbe begins to digest the thickening agent in the gelled fluid and/or releases enzymes that that breakdown the thickening agent.

In one embodiment, viscosity reducing microbes may include any bacteria or fungus capable of digesting or degrading the thickening agent in the gelled fluid, thereby reducing the viscosity of the gelled fluid. The microbes may produce biochemicals such as enzymes to degrade the targeted gelled fluid or filter cake. The microbe may live in the gelled fluid to continuously reduce the viscosity of the gelled fluid. Additionally, the microbe may imbed itself in the filter cake and digest or degrade the filter cake.

The present invention relates to a method for reducing viscosity of a gelled fluid, comprising forming a gelled fluid; and adding an effective amount of a microbial composition to the fluid to reduce the viscosity of the gelled fluid, where the microbial composition includes a viscosity reducing microbe.

The present invention relates to a method for reducing viscosity of a gelled fluid, comprising forming a gelled fluid. A first amount of a first microbial composition is then added to the fluid, where the first microbial composition comprises a viscosity reducing microbe. A second amount of a second microbial composition is added to the fluid, where the second microbial composition comprises a viscosity reducing microbe surrounded by an encapsulating agent. The first and second amounts are adjusted to produce a desired viscosity reduction profile. The amounts can be added together or separately.

The present invention relates to a method for reducing viscosity of a gelled fluid, comprising forming a gelled fluid and adding an effective amount of a releasable microbial composition comprising a viscosity reducing microbe. The releasable microbial composition is released in response to a change in a fluid property, where the release microbe or enzymes produced by the microbe reduce the viscosity to a desired value or according to a controlled viscosity reduction profile. The fluid property can be temperature, pressure, pH, an additive, an activating agent, or a mixture thereof.

The present invention relates to an apparatus for reducing viscosity of a gelled fluid, comprising a capsule containing a viscosity reducing microbe disposed within the capsule, wherein the capsule is adapted to release the viscosity reducing microbe into gelled fluid over time or in response to a change in a fluid property. Again, the fluid property can be temperature, pressure, pH, an additive, an activating agent, or a mixture thereof.

The present invention relates to an apparatus for reducing viscosity of a gelled fluid, comprising an outer shell and an interior filled with a viscosity reducing microbe. The outer shell is adapted to rupture in response to a change in a fluid property and once ruptured to release a viscosity reducing microbe disposed within the capsule.

The present invention relates to a fluid composition for wellbore operations, comprising an aqueous fluid, a fluid thickener; and a capsule containing a viscosity reducing microbe, where the viscosity reducing microbe, once released into the fluid, is adapted to degrade the fluid thickener upon contact therewith and where the capsule is designed to release the microbe in response to a change in a fluid property.

The present invention relates to a composition for fracturing a subterranean formation containing a gas and/or crude oil and penetrated by a wellbore, the composition comprising a fracturing fluid. The fracturing fluid includes a gelled fluid and a microbial viscosity reducing composition, where the viscosity reducing microbe is adapted to degrade the fluid thickener upon contact therewith.

The present invention relates to a method for fracturing a formation comprising pumping, into a producing formation at a pressure sufficient to fracture the formation and to enhance productivity, a fracturing fluid comprising a gelled fluid comprising a microbial digestible thickening agent, where the gelled fluid raises the viscosity of fluid to enhance the formation for fracture in the formation, and a proppant, where the proppant props opened fracturing formed in the formation. The method also includes injecting a microbial composition comprising a viscosity reducing microbe in the fluid, where the composition reduces the viscosity of the gelled fluid.

The present invention relates to a method for fracturing a formation including the step of pumping a fracturing fluid into a producing formation at a pressure sufficient to fracture the formation and to enhance productivity, where the fluid comprises a gelled fluid comprising a microbial digestible thickening agent, where the gelled fluid raises the viscosity of fluid to enhance the formation for fracture in the formation. The method also includes the step of pumping in a proppant fluid including a proppant, where the proppant props opened fracturing formed in the formation. The method also includes the step of injecting a microbial composition comprising a viscosity reducing microbe in the fluid, where the composition reduces the viscosity of the gelled fluid.

The present invention relates to a method for fracturing a formation including the step of pumping a fracturing fluid into a producing formation at a pressure sufficient to fracture the formation and to enhance productivity, where the fluid comprises a gelled fluid comprising a microbial digestible thickening agent, where the gelled fluid raises the viscosity of fluid to enhance the formation for fracture in the formation. The method also includes the step pumping in a proppant fluid including a proppant, where the proppant props opened fracturing formed in the formation The method also includes the step pumping a delayed microbial composition comprising a viscosity reducing microbe in the fluid, where the composition is adapted to rupture in response to a change in a fluid property. The method also includes the step changing a fluid property to release the microbe.

Suitable Reagents

Suitable viscosity reducing microbes include, without limitation, any bacteria or other microorganism capable of breaking down or digesting a thickening agent used in a gelled fluid. Exemplary viscosity reducing microbes include bacteria from the *Thermotogas* species, which is a group of hyperthermophilic bacteria, such as *Thermotoga neapolitana* and *Thermotoga maritime*. Suitable bacteria also include those in the class *Bacillus, Citrobacter*, and *Enterococcus*, such as *Bacillus subtilis, Citrobacter freundii*, and *Enterococcus faecalies*. Viscosity reducing microbes may also be a fungus such as *Aspergillus niger*. In one embodiment, one or more types of microbes may be combined and used to reduce the viscosity of the fluid and degrade the filter cake. Exemplary viscosity reducing bacteria are disclosed in U.S. Pat. No. 6,110,875, which is incorporate herein by reference. These microbes can be in the form of the microbes themselves or encapsulated in an encapsulating agent.

In one embodiment, the microbe may be selected for its ability to digest or degrade a specific polymeric thickening agent. For example, *Thermotoga neapolitana* is known to produce hydrolases. Hydrolases are a class of enzymes suitable for treating guar-containing filter cakes. These enzymes attack the mannosidic and galactomannosidic linkages in the guar residue, breaking the molecules into monosaccharide and disaccharide fragments. Under some conditions, these enzymes hydrolyze the residue completely into monosaccharide fragments. The preferred enzymes for the guar-containing filter cake are galactomannan hydrolases collectively called galactomannanase, and they specifically hydrolyze the (1,6)-α-D-galactomannosidic and the (1,4)-β-D-mannosidic linkages between the monosaccharide units in the guar-containing filter cake, respectively.

In addition to hydrolases, other suitable enzymes for reducing viscosity of gelled fluids include cellulase, hemicellulases, glucosidases, endoxylanase, exo-xylanase, endo-amylases, oxidase, and combinations thereof. Other exemplary viscosity reducing enzymes are disclosed in U.S. Pat. Nos. 5,247,995 and 6,818,594, which are incorporated herein by reference.

Suitable downhole environments for the microbes include a temperature range between about 50° F. and about 250° F. In certain embodiments, the temperature range is between about 80° F. and about 195° F. The pH should be in range between about 2 pH to about 11 pH. In certain embodiments, the pH ranges between about 4 pH and about 9 pH. In addition, metabolic activity of the microbes may be controlled by adjusting the downhole conditions. For example, metabolic activity of the microbe may be enhanced by increasing the temperature to the upper range.

The viscosity reducing microbe may be encapsulated to allow a delayed released composition. In one embodiment, the microbe may be physically sequestered within a polymeric capsule impermeable to the microbe. The microbe may be contained in liquid when added to the capsule. For example, the microbe may be trapped in a functional polymer matrix that is pH sensitive, with the microbe being released by adjusting the pH of the surrounding fluid. For example, if the encapsulating matrix is destroyed at high pH, then after injection or during injection of the encapsulated composition, the pH can be raised resulting in microbe release. Another example is to precipitate the microbe and trap the microbe within a semi-permeable nylon shell, where the shell is then disrupted by raising the pH of the surrounding fluid to a high pH.

Suitable encapsulating agents include, without limitation, any encapsulating agent that is adapted to encapsulate microbes and are capable of being released by a change in temperature, exposure of an aqueous solution in the presence or absence of an encapsulated degradation agent, a change in pH, a change in pressure, a change in shear, or a combination of any of these conditions.

In other embodiments, the microbe is encapsulated by an acid- or alkaline-responsive material that is caused to release the microbe in response to an appropriate pH change in the capsule surroundings. Various materials and techniques for encapsulating compounds and enzymes under conditions compatible with maintaining the activity of enzymes are disclosed in one or more of the following U.S. Pat. Nos. 4,202,795, 5,837,290; 5,805,264; 5,310,721; 4,978,481; 4,968,532; 4,619,764; 4,003,846; 5,094,785 or in PCT publication WO 97/24178. The disclosures of these patents are incorporated herein by reference. Additional guidance for encapsulating compounds and enzymes under acceptable conditions is provided in one or more of the following U.S. Pat. Nos. 5,492, 646; 5,460,817; 5,194,263; 5,035,900; 5,324,445; 5,972,363; 5,972,387; 5,968,794; 5,965,121; 5,962,015; 5,955,503; 5,932,385; 5,916,790; 5,914,182; 5,908,623; and 5,895,757. The disclosures of these patents are incorporated herein by reference.

In another embodiment, the encapsulation method involves introducing the microbe into hollow or porous, crushable and fragile beads. The beads are then added to the gelled fluid and introduce into the subterranean formation under pressure. When the fracturing fluid passes or leaks off into the formation, or the fluid is removed by back flowing, the resulting fractures in the subterranean formation close and crush the beads. The crushing of the beads then releases the viscosity-reducing microbes into the fluid. An example of this process is disclosed in U.S. Pat. No. 4,506,734, which is incorporated herein by reference.

The viscosity reducing microbes may be used to break the viscosity of gelled fluids formed by adding thickening agents such as hydrating polymers and viscoelastic surfactants. In one embodiment, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time sufficient to form a hydrated solution.

A wide variety of hydratable water soluble polymers are used in fracturing fluid formulations including polysaccharides, polyacrylamides, and polyacrylamide copolymers. Suitable polysaccharides include galactomannan gum and cellulose derivatives. Preferred polysaccharides include guar gum, locust bean gum, carboxymethylguar, hydroxyethylguar, hydroxypropylguar, carboxymethylhydroxypropylguar, carboxymethylhydroxyethylguar, hydroxymethyl cellulose, carboxymethylhydroxyethyl cellulose, and hydroxyethyl cellulose.

The hydratable polymer useful in the present invention can be any of the hydratable polysaccharides having galactose or mannose monosaccharide components and are familiar to those in the well service industry. These polysaccharides are capable of gelling in the presence of a crosslinking agent to form a gelled based fluid. For instance, suitable hydratable polysaccharides are the galactomannan gums, guars and derivatized guars. Specific examples are guar gum and guar gum derivatives. Suitable gelling agents are guar gum, hydroxypropyl guar and carboxymethyl hydroxypropyl guar. In certain embodiment, the hydratable polymers for the present invention are guar gum and carboxymethyl hydroxypropyl guar and hydroxypropyl guar. Other exemplary fracturing fluid formulations are disclosed in U.S. Pat. Nos. 5,201,370 and 6,138,760, which are incorporated herein by reference.

The hydratable polymer is added to the aqueous fluid in concentrations ranging from about 0.12% to 0.96% by weight of the aqueous fluid. In certain embodiments, the range for the present invention is about 0.3% to about 0.48% by weight.

In addition to the hydratable polymer, the fracturing fluids of the invention include a crosslinking agent. The crosslinking agent can be any of the conventionally used crosslinking agents which are known to those skilled in the art. For instance, in recent years, gellation of the hydratable polymer has been achieved by crosslinking these polymers with metal ions including aluminum, antimony, zirconium and titanium containing compounds including the so-called organotitinates. See, for instance, U.S. Pat. No. 4,514,309. Recent research indicates that guar gels, which are crosslinked by the additions of borate ion donating materials, clean up faster and yield higher sand pack permeability than guar gels crosslinked with other crosslinking agents. As a result, the borate crosslinking agents are preferred. Common crosslinking agents include polyvalent ions in their high valance state such as Ti(IV), Zr(IV) in the form of salts of organic acids.

In the case of the borate crosslinkers, the crosslinking agent is any material which supplies borate ions in solution. Thus the crosslinking agent can be any convenient source of borate ions, for instance the alkali metal and the alkaline earth metal borates and boric acid. A preferred crosslinking additive is sodium borate decahydrate. This crosslinking additive is preferably present in the range from about 0.024% to in excess of 0.18% by weight of the aqueous fluid. Preferably, the concentration of crosslinking agent is in the range from about 0.024% to about 0.09% by weight of the aqueous fluid.

Propping agents are typically added to the base fluid prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 18 pounds per gallon of fracturing fluid composition, but higher or lower concentrations can be used as required. The base fluid can also contain other conventional additives common to the well service industry such as surfactants, and the like.

In a typical fracturing operation, the fracturing fluid is pumped at a rate sufficient to initiate and propagate a fracture in the formation and to place propping agents into the fracture. A typical fracturing treatment would be conducted by hydrating a 0.24% to 0.72% (weight/volume [w/v]) galactomannan based polymer, such as guar, in a 2% (w/v) KCl solution. In addition to the encapsulated viscosity reducing microbes, the fracturing fluid may include additives such as the crosslinking agent, proppant, and other additives.

Fracturing Fluids

Generally, a hydraulic fracturing treatment involves pumping a proppant-free viscous fluid, or pad, usually water with some fluid additives to generate high viscosity, into a well faster than the fluid can escape into the formation so that the pressure rises and the rock breaks, creating artificial fracture and/or enlarging existing fracture. After fracturing the formation, a propping agent, generally a solid material such as sand is added to the fluid to form a slurry that is pumped into the newly formed fractures in the formation to prevent them from closing when the pumping pressure is released. The proppant transport ability of a base fluid depends on the type of viscosifying additives added to the water base.

Water-base fracturing fluids with water-soluble polymers added to make a viscosified solution are widely used in the art of fracturing. Since the late 1950s, more than half of the fracturing treatments are conducted with fluids comprising guar gums, high-molecular weight polysaccharides composed of mannose and galactose sugars, or guar derivatives such as hydropropyl guar (HPG), carboxymethyl guar (CMG). carboxymethylhydropropyl guar (CMHPG). Crosslinking agents based on boron, titanium, zirconium or aluminum complexes are typically used to increase the effective molecular weight of the polymer and make them better suited for use in high-temperature wells.

To a lesser extent, cellulose derivatives such as hydroxyethylcellulose (HEC) or hydroxypropylcellulose (HPC) and carboxymethylhydroxyethylcellulose (CMHEC) are also used, with or without crosslinkers. Xanthan and scleroglucan, two biopolymers, have been shown to have excellent proppant-suspension ability even though they are more expensive than guar derivatives and therefore used less frequently. Polyacrylamide and polyacrylate polymers and copolymers are used typically for high-temperature applications or friction reducers at low concentrations for all temperatures ranges.

Polymer-free, water-base fracturing fluids can be obtained using viscoelastic surfactants. These fluids are normally prepared by mixing in appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

"Waterfrac treatments employ the use of low cost, low viscosity fluids in order to stimulate very low permeability reservoirs. The results have been reported to be successful (measured productivity and economics) and rely on the mechanisms of asperity creation (rock spalling), shear displacement of rock and localized high concentration of proppant to create adequate conductivity. It is the last of the three mechanisms that is mostly responsible for the conductivity obtained in "waterfrac" treatments. The mechanism can be described as analogous to a wedge splitting wood.

An aqueous fracturing fluid may be prepared by blending a hydratable polymer with an aqueous base fluid. The base aqueous fluid can be, for example, water or brine. Any suitable mixing apparatus may be used for this procedure. In the case of batch mixing, the hydratable polymer and aqueous fluid are blended for a period of time which is sufficient to form a hydrated sol.

Hydraulic fracturing techniques are widely employed to enhance oil and gas production from subterranean formations. During hydraulic fracturing, fluid is injected into a well bore under high pressure. Once the natural reservoir pressures are exceeded, the fracturing fluid initiates a fracture in the formation which generally continues to grow during pumping. As the fracture widens to a suitable width during the course of the treatment, a propping agent is then also added to the fluid. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives. Employing crosslinking agents, such as borate, titanate, or zirconium ions, can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In order for the treatment to be successful, it is preferred that the fluid viscosity eventually diminish to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation under the influence of formation fluids. This viscosity reduction or conversion is referred to as "breaking" and can be accomplished by incorporating chemical agents, referred to as "breakers," into the initial gel.

Certain gels of fracturing fluids, such as those based upon guar polymers, undergo a natural break without the intervention of a breaking agent. However, the breaking time for such gelled fluids generally is excessive and impractical, being somewhere in the range from greater than 24 hours to in excess of weeks, months, or years depending on reservoir conditions. Accordingly, to decrease the break time of gels used in fracturing, chemical agents are usually incorporated into the gel and become a part of the gel itself. Typically, these agents are either oxidants or enzymes which operate to degrade the polymeric gel structure. Most degradation or "breaking" is caused by oxidizing agents, such as persulfate salts (used either as is or encapsulated), chromous salts, organic peroxides or alkaline earth or zinc peroxide salts, or by enzymes.

In addition to the importance of providing a breaking mechanism for the gelled fluid to facilitate recovery of the fluid and to resume production, the timing of the break is also of great importance. Gels which break prematurely can cause suspended proppant material to settle out of the gel before being introduced a sufficient distance into the produced fracture. Premature breaking can also lead to a premature reduction in the fluid viscosity, resulting in a less than desirable fracture width in the formation causing excessive injection pressures and premature termination of the treatment.

On the other hand, gelled fluids which break too slowly can cause slow recovery of the fracturing fluid from the produced fracture with attendant delay in resuming the production of formation fluids and severely impair anticipated hydrocarbon production. Additional problems may occur, such as the tendency of proppant to become dislodged from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment. Gels useful in this regard include those disclosed in U.S. Pat. Nos. 3,960,736; 5,224,546; 6,756,345; and 6,793,018, incorporated herein by reference.

Suitable solvents fore use in this invention include, without limitation, water. The solvent may be an aqueous potassium chloride solution.

Suitable inorganic breaking agent include, without limitation, a metal-based oxidizing agent, such as an alkaline earth metal or a transition metal; magnesium peroxide, calcium peroxide, or zinc peroxide.

Suitable ester compound include, without limitation, an ester of a polycarboxylic acid, e.g., an ester of oxalate, citrate, or ethylene diamine tetraacetate. Ester compound having hydroxyl groups can also be acetylated, e.g., acetylated citric acid to form acetyl triethyl citrate.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. In certain embodiment, a range for the hydratable polymer is about 0.20% to about 0.80% by weight.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable crosslinking agents is borates as described, for example, in U.S. Pat. No. 4,514,309. The selection of an appropriate crosslinking agent depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base.

The boron constituent can be selected from the group consisting of boric acid, sodium tetraborate, and mixtures thereof. These are described in U.S. Pat. No. 4,514,309.), borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

"Premature breaking" as used herein refers to a phenomenon in which a gel viscosity becomes diminished to an undesirable extent before all of the fluid is introduced into the formation to be fractured. Thus, to be satisfactory, the gel viscosity should preferably remain in the range from about 50% to about 75% of the initial viscosity of the gel for at least two hours of exposure to the expected operating temperature. Preferably the fluid should have a viscosity in excess of 100 centipoise (cP) at 100 $\sec^{-1}$ while injection into the reservoir as measured on a Fann 50 C viscometer in the laboratory.

"Complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-crosslinked gel is one whose viscosity is about 10 cP or less as measured on a Model 35 Farm viscometer having a R1B1 rotor and bob assembly rotating at 300 rpm.

The pH of an aqueous fluid which contains a hydratable polymer can be adjusted if necessary to render the fluid compatible with a crosslinking agent. Preferably, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. Preferably, the pH is kept neutral or basic, i.e., from about 7 to about 14, more preferably between about 8 to about 12.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219.

Generally, the temperature and the pH of a fracturing fluid affects the rate of hydrolysis of an ester. For downhole operations, the bottom hole static temperature ("BHST") cannot be easily controlled or changed. The pH of a fracturing fluid usually is adjusted to a level to assure proper fluid performance during the fracturing treatment. Therefore, the rate of hydrolysis of an ester could not be easily changed by altering BHST or the pH of a fracturing fluid. However, the rate of hydrolysis may be controlled by the amount of an ester used in a fracturing fluid. For higher temperature applications, the hydrolysis of an ester may be retarded or delayed by dissolving the ester in a hydrocarbon solvent. Moreover, the delay time may be adjusted by selecting esters that provide more or less water solubility. For example, for low temperature applications, polycarboxylic esters made from low molecular weight alcohols, such as methanol or ethanol, are recommended. The application temperature range for these esters could range from about 120° F. to about 250° F. (about 49° C. to about 121° C.). On the other hand, for higher temperature applications or longer injection times, esters made from higher molecular weight alcohols should preferably be used. The higher molecular weight alcohols include, but are not limited to, $C_3$-$C_6$ alcohols, e.g., n-propanol, hexanol, and cyclohexanol.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

The well treatment fluid composition in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fluid composition is to use it as a fracturing fluid. Accordingly, embodiments of the invention also provide a method of treating a subterranean formation. The method includes formulating a fracturing fluid comprising an aqueous fluid, a hydratable polymer, a crosslinking agent, an inorganic breaking agent, and an ester compound; and injecting the fracturing fluid into a bore hole to contact at least a part of the formation by the fracturing fluid under a sufficient pressure to fracture the formation. Initially, the viscosity of the fracturing fluid should be maintained above at least 200 cP at 40 sec$^{-1}$ during injection and, afterwards, should be reduced to less than 200 cP at 40 sec$^{-1}$. After the viscosity of the fracturing fluid is lowered to an acceptable level, at least a portion of the fracturing fluid is removed from the formation. During the fracturing process, a proppant can be injected into the formation simultaneously with the fracturing fluid. Preferably, the fracturing fluid has a pH around or above about 7, more preferably in the range of about 8 to about 12.

It should be understood that the above-described method is only one way to carry out embodiments of the invention. The following U.S. patents disclose various techniques for conducting hydraulic fracturing which may be employed in embodiments of the invention with or without modifications:

U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt (NaCO.sub.3, NaCl, KCl, etc.) has been added. The liquid carrier is preferably present in an amount of at least about 80% by weight. Specific examples of the amount of liquid carrier include 80%, 85%, 90%, and 95% by weight.

All the fracturing fluids described above are described herein in relationship to the sole use or combined use of a microbial based viscosity breaking composition, apparatus or method of this invention. Of course, the microbial based viscosity breaking composition, apparatus or method of this invention can be used in conjunction or combinations of other gelling and breaking compositions to achieve a desired fracturing and breaking profile (viscosity versus time profile).

EXPERIMENTS OF THE INVENTION

Example 1

This example illustrates the breaking characteristics of an embodiment of a microbial composition designated GUM-BAC™ available from Micro-Bac International, Inc. of Round Rock, Tex. compared to controls at pH 7 over a 17 day period of time. The microbial composition is either unencapsulated or encapsulated.

Four samples were prepared for this viscosity breaking study. The fluid used in this example was a guar containing gelled fluid. The gelled fluid was formed by mixing 20 pounds of guar per thousand gallons (ppt) of a 2% KCl aqueous solution prepared using Sparklet bottled water purchased in San Antonio, Tex. The viscosity testing was carried out at a temperature of 150° F. and at a pH between 7.2 and 7.4. The sample 1, designated Blank, was the gelled fluid itself, without additives, and served as a reference or control. The sample 2, designated Blank+0.05 gpt Biocide, was prepared as above with the addition of 0.05 gpt of a biocide. The sample 3, designated Blank+5 gpt GUM-BAC™, was prepared as above with the addition of 5 gpt of the microbial composition GUM-BAC™. The sample 4, designated Blank+5 ppt encapsulated GUM-BAC™, was prepared as above with the addition of 5 ppt an encapsulated composition of GUM-BAC™. The results of the viscosity testing is tabulated in Table 1 and shown graphically in FIG. 1.

TABLE 1

Viscosity Reduction Results of a GUM-BAC ™ Microbial Composition (Non-Encapsulated and Encapsulated) in a Guar Gelled Fluid @ 150° F. and @ pH 7.2 to 7.4

| Time of Evaluation | Sample 1 Control | Sample 2 Control + 0.05 gpt Biocide | Sample 3 Control + 5 gpt GUM-BAC ™ | Sample 4 Control + 5 ppt GUM-BAC ™† |
|---|---|---|---|---|
| 2 hours | 66.8 | 60.2 | 34.7 | 62.4 |
| 1 Day | 26.6 | 26.5 | 7.6 | 25.3 |
| 2 Days | 23.2 | 23.3 | 5.8 | 20.8 |
| 3 Days | 19.7 | 22.3 | 5.8 | 18.2 |
| 7 Days | 15.7 | 16.0 | 7.1 | 8.9 |
| 8 Days | 13.0 | 14.4 | 4.6 | 8.6 |
| 11 Days | 13.2 | 11.4 | 2.6 | 7.3 |
| 14 Days | 12.6 | 9.2 | 3.2 | 4.7 |
| 17 Days | 12.7 | 8.04 | — | 6.0 |

†encapsulated

It can be seen from the data in Table 1 and in the plot of FIG. 1 that after two hours, the viscosity of the gelled fluid for Sample 3 had decreased more than the other 3 samples. In fact, the viscosity profile for Sample 3, indicates that the un-encapsulated microbial composition was a faster acting, higher breaking activity, composition than the encapsulated microbial composition. This result is likely due to the fact that the microbe in the unencapsulated compositions was effective in reducing fluid viscosity immediately upon introduction and did not have to wait for release from the encapsulating agent. The data also indicates that breaking onset and viscosity reduction can be controlled using a microbial composition with or without encapsulation.

Example 2

This example illustrates the breaking characteristics of another embodiment of a microbial composition designated GUM-BAC™ available from Micro-Bac International, Inc. of Round Rock, Tex. compared to controls at pH 10 over a 17 day period of time. The microbial composition is either unencapsulated or encapsulated.

Four samples were prepared for this viscosity breaking study. The fluid used in this example was a guar containing gelled fluid. The gelled fluid was formed by mixing 20 pounds of guar per thousand gallons (ppt) of a 2% KCl aqueous solution prepared using Sparklet bottled water purchased in San Antonio, Tex. The viscosity testing was carried out at a temperature of 150° F. and at a pH between 10.2 and 10.4. The sample 1, designated Blank, was the gelled fluid itself, without additives, and served as a reference or control. The sample 2, designated Blank+0.05 gpt Biocide, was prepared as above with the addition of 0.05 gpt of a biocide. The sample 3, designated Blank+5 gpt GUM-Bac GUM-BAC™, was prepared as above with the addition of 5 gpt of the microbial composition GUM-BAC™. The sample 4, designated Blank+5 ppt encapsulated GUM-BAC™, was prepared as above with the addition of 5 ppt an encapsulated composition of GUM-BAC™. The results of the viscosity testing is tabulated in Table 2 and shown graphically in FIG. 2.

TABLE 2

Viscosity Reduction Results of a GUM-BAC ™ Microbial Composition (Non-Encapsulated and Encapsulated) in a Guar Gelled Fluid @ 150° F. and @ pH 10.2 to 10.4

| Time of Evaluation | Sample 1 Control | Sample 2 Control + 0.05 gpt Biocide | Sample 3 Control + 5 gpt GUM-BAC ™ | Sample 4 Control + 5 ppt GUM-BAC ™† |
|---|---|---|---|---|
| 2 hours | 62.5 | 44.2 | 61.3 | 61.7 |
| 1 Day | 14.4 | 10.6 | 15.6 | 14.8 |
| 2 Days | 11.0 | 9.1 | 13.9 | 12.7 |
| 3 Days | 11.2 | 8.6 | 12.2 | 11.3 |
| 7 Days | 10.6 | 9.2 | 11.2 | 8.9 |
| 8 Days | 11.6 | 9.0 | 10.6 | 10.7 |
| 11 Days | 10.2 | 8.2 | 9.8 | 9.5 |
| 14 Days | 10.4 | 7.6 | 9.2 | 9.4 |
| 17 Days | 9.7 | 7.6 | 8.0 | 9.5 |

†encapsulated

Figure 2:
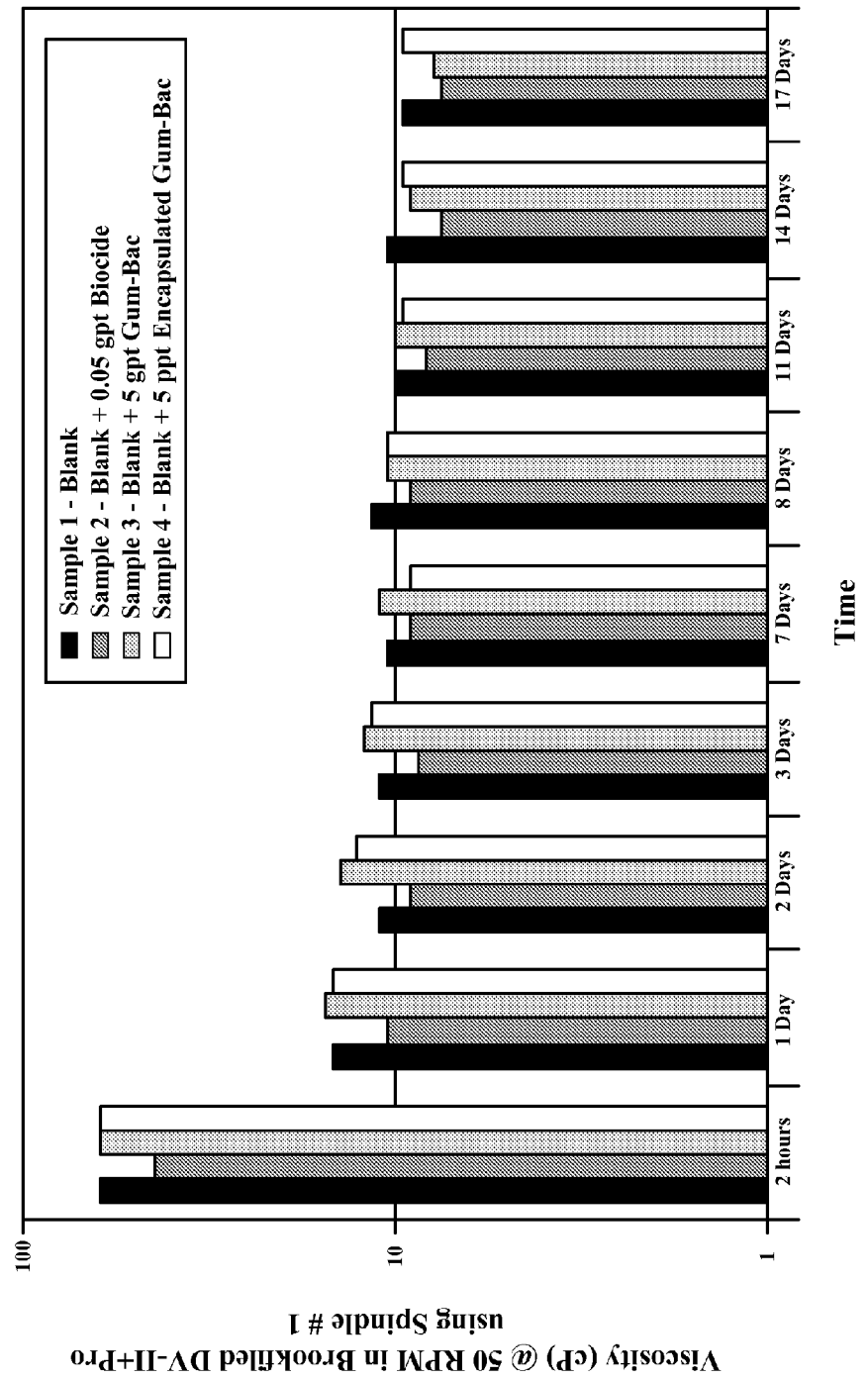
FIG. 2 shows the results of the viscosity reducing effects of the embodiment of a microbial composition, in an unencapsulated and encapsulated form at pH 10.

It can be seen from the data in Table 2 and in the plot of FIG. 2 that at pH 10, the microbial compositions showed little improvement over the control. Thus, the microbial compositions show some pH sensitivity evidencing higher activity as lower pH.

Example 3

This example illustrates the breaking characteristics of another embodiment of a microbial composition designated XG-BAC™ also available from Micro-Bac International, Inc. of Round Rock, Tex. compared to controls at pH 7 and pH 10. The microbial composition is unencapsulated.

Four samples were prepared for this viscosity breaking study. The fluid used in this example was a guar containing gelled fluid. The gelled fluid was formed by mixing 20 pounds of guar per thousand gallons (ppt) in a 2% KCl aqueous solution prepared using Sparklet bottled water purchased in San Antonio, Tex. The viscosity testing was carried out at a temperature of 150° F. and at a pH of 7.19 and 10.43. The sample 1, designated Blank @ pH7.19, was the gelled fluid itself at pH 7.19, without additives, and served as a pH 7.19 reference or control. The sample 2 designated Blank+5 gpt XG-BAC™, was prepared as above with the addition of 5 gpt of XG-BAC™ also at pH 7.19. The sample 3, designated Blank @ pH 10.43, was the gelled fluid itself at pH 10.43, without additives, and served as a pH 10.43 reference or control. The sample 4, designated Blank+5 gpt XG-BAC™, was prepared as above with the addition of 5 gpt of XG-BACT™ at pH 10.43. The results of the viscosity testing is tabulated in Table 3 and shown graphically in FIG. 3.

TABLE 3

Viscosity Reduction Results of a XG-BAC ™ Microbial Composition (Non-Encapsulated and Encapsulated) in a Guar Gelled Fluid @ 150° F. and @ pH 7.19 and 10.43

| Time of Evaluation | Sample 1 Control @ pH 7.19 | Sample 2 Control + 5 gpt XG-BAC ™ @ pH 7.19 | Sample 3 Control @ pH 10.43 | Sample 4 Control + 5 ppt XG-BAC ™† @ pH 10.43 |
|---|---|---|---|---|
| 0 hours | 60.2 | 59.9 | 58.2 | 58.7 |
| 1 Day | 31.7 | 27.8 | 12.6 | 12.1 |
| 2 Days | 25.4 | 21.4 | 11.3 | 15.4 |
| 3 Days | 12.6 | 12.1 | 10.1 | 10.3 |
| 7 Days | 14.5 | 11.4 | 11.4 | 12.5 |
| 11 Days | 12.7 | 8.8 | 10.9 | 10.3 |
| 15 Days | 12.4 | 4.92 | 10.6 | 9.5 |

†encapsulated

Figure 3:
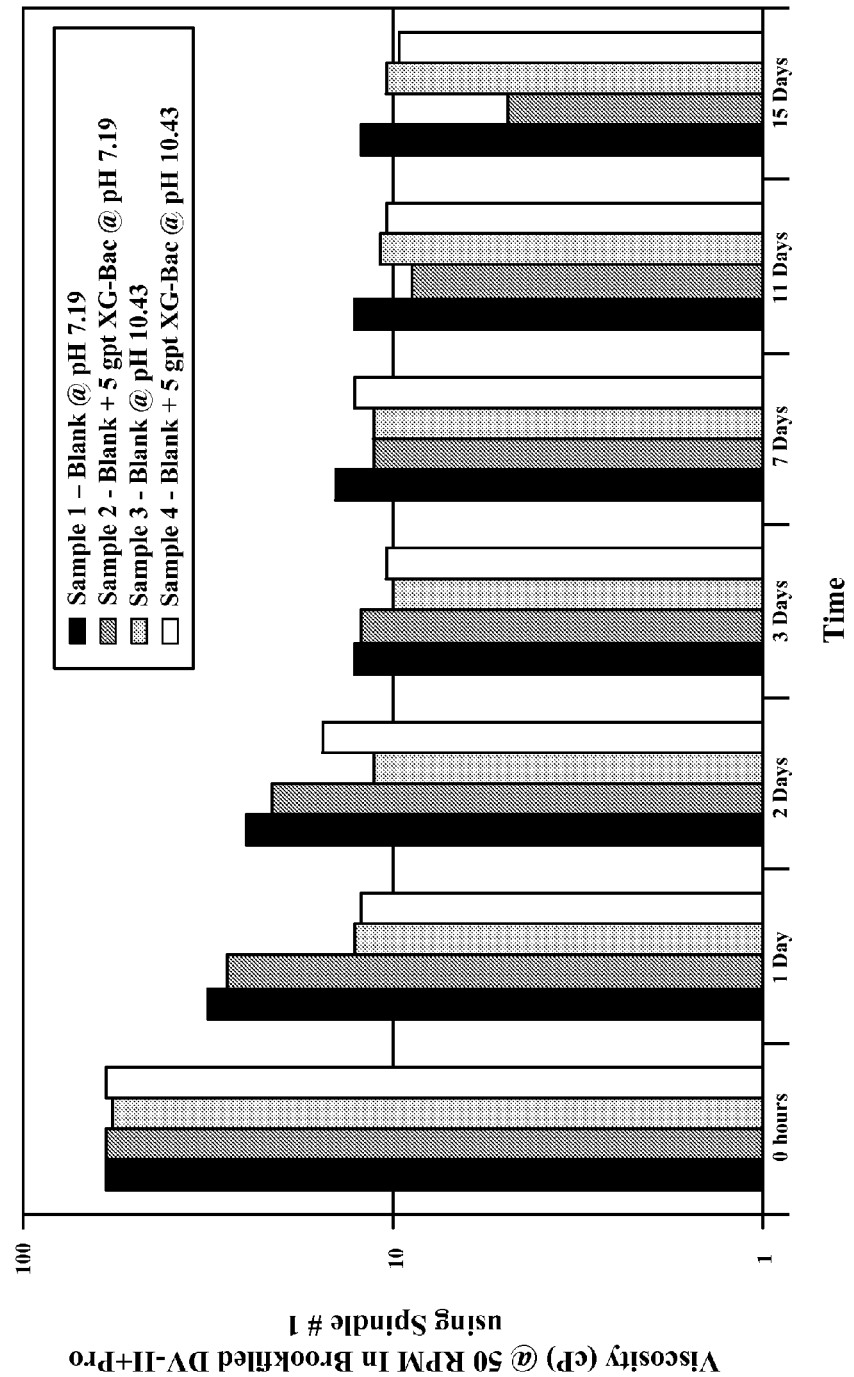
FIG. 3 shows the results of the viscosity reducing effects of another embodiment of a microbial composition, in an unencapsulated and encapsulated form at pH 7 and pH 10.

It can be seen from the data in Table 3 and in the plot of FIG. 3 that the microbial compositions showed enhanced viscosity reduction activity at pH 7.19 than at pH 10.42. The data also showed again indicates that the un-encapsulated microbial composition was a faster acting, higher breaking activity, composition than the encapsulated microbial composition. This result is likely due to the fact that the microbe in the unencapsulated compositions was effective in reducing fluid viscosity immediately upon introduction and did not have to wait for release from the encapsulating agent. The data also indicates that breaking onset and viscosity reduction can be controlled using a microbial composition with or without encapsulation.

Example 4

This example illustrates the breaking characteristics of another embodiment of a microbial composition designated GUM-BAC™ available from Micro-Bac International, Inc. of Round Rock, Tex. compared to controls at a pH between 7.9 and 8.7 over an 11 day period of time. The microbial composition is either unencapsulated or encapsulated.

Four samples were prepared for this viscosity breaking study. The fluid used in this example was a guar containing gelled fluid. The gelled fluid was formed by mixing 20 pounds of guar per thousand gallons (ppt) of a 2% KCl aqueous solution prepared using San Antonio tap water. The viscosity testing was carried out at a temperature of 150° F. and at a pH between 10.2 and 10.4. The sample 1, designated Blank, was the gelled fluid itself, without additives, and served as a reference or control. The sample 2, designated Blank+0.05 gpt Biocide, was prepared as above with the addition of 0.05 gpt of a biocide. The sample 3, designated Blank+5 gpt GUM-BAC™, was prepared as above with the addition of 5 gpt of the microbial composition GUM-BAC™. The sample 4, designated Blank+5 ppt encapsulated GUM-BAC™, was prepared as above with the addition of 5 ppt an encapsulated composition of GUM-BAC™. The results of the viscosity testing is tabulated in Table 4 and shown graphically in FIG. 4.

TABLE 4

Viscosity Reduction Results of a GUM-BAC ™ Microbial Composition (Non-Encapsulated and Encapsulated) in a Tap Water Based, Gua Gelled Fluid @ 150° F.

| Time of Evaluation | Sample 1 Control | Sample 2 Control + 0.05 gpt Biocide | Sample 3 Control + 5 gpt GUM-BAC ™ | Sample 4 Control + 5 ppt GUM-BAC ™† |
|---|---|---|---|---|
| 0 hours | 47.0 | 48.0 | 47.0 | 48.0 |
| 2 Days | 38.9 | 41.0 | 30.9 | 36.2 |

TABLE 4-continued

Viscosity Reduction Results of a GUM-BAC ™ Microbial
Composition (Non-Encapsulated and Encapsulated) in
a Tap Water Based, Gua Gelled Fluid @ 150° F.

| Time of Evaluation | Sample 1 Control | Sample 2 Control + 0.05 gpt Biocide | Sample 3 Control + 5 gpt GUM-BAC ™ | Sample 4 Control + 5 ppt GUM-BAC ™† |
|---|---|---|---|---|
| 4 Days | 34.6 | 34.4 | 25.0 | 29.3 |
| 8 Days | 27.6 | 27.2 | 21.1 | 17.0 |
| 11 Days | 20.1 | 21.9 | 16.6 | 14.8 |

†encapsulated

Figure 4:
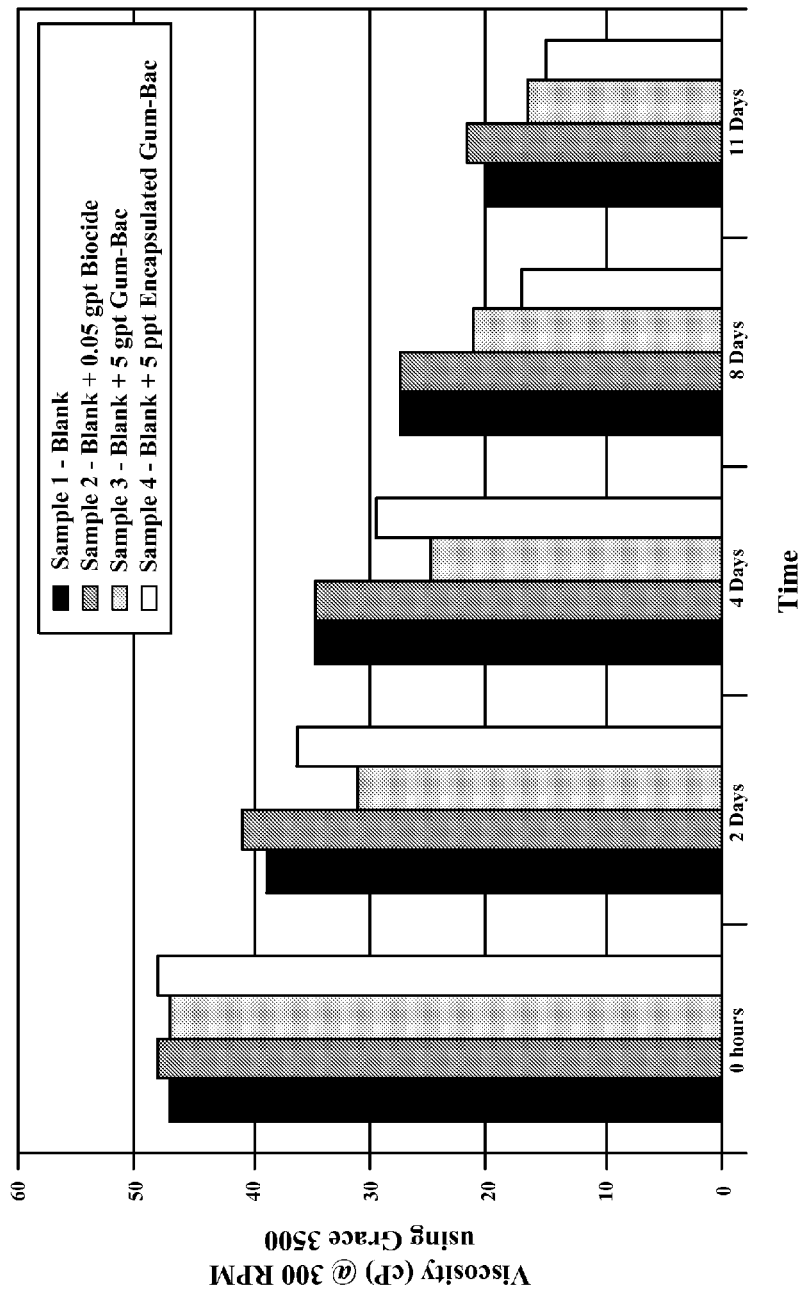
FIG. 4 shows the results of the viscosity reducing effects of an embodiment of a microbial composition, in an unencapsulated and encapsulated form at a pH between about 7.9 and 8.7 in tap water.

It can be seen from the data in Table 4 and in the plot of FIG. 4 that microbial compositions are effective viscosity reducing agents. Again, the unencapsulated microbial composition was faster acting than the encapsulated microbial composition. In this study, the encapsulated compositions also showed good viscosity reduction and by Day 8, the encapsulated Sample 4 now showed greater viscosity reduction compared to the unencapsulated Sample 3. The change between Day 4 and Day 8 of Sample 4 may be attributed to the release of a substantial amount of the active material. Further, the additional viscosity reduction of Sample 4 over Sample 3 may be attributed to the effect of the active material living in the gelled fluid, thereby having an extended viscosity reducing effects.

Example 5

This example illustrates the breaking characteristics of another embodiment of a microbial composition designated GUM-BAC™ available from Micro-Bac International, Inc. of Round Rock, Tex. compared to controls at a pH between 9.9 and 10.8 over an 11 day period of time. The microbial composition is either unencapsulated or encapsulated.

Four samples were prepared for this viscosity breaking study. The fluid used in this example was a guar containing gelled fluid. The gelled fluid was formed by mixing 20 pounds of guar per thousand gallons (ppt) of a 2% KCl aqueous solution prepared using San Antonio tap water. The viscosity testing was carried out at a temperature of 150° F. and at a pH between 10.2 and 10.4. The sample 1, designated Blank, was the gelled fluid itself, without additives, and served as a reference or control. The sample 2, designated Blank+0.05 gpt Biocide, was prepared as above with the addition of 0.05 gpt of a biocide. The sample 3, designated Blank+5 gpt GUM-BAC™, was prepared as above with the addition of 5 gpt of the microbial composition GUM-BAC™. The sample 4, designated Blank+5 ppt encapsulated GUM-BAC™, was prepared as above with the addition of 5 ppt an encapsulated composition of GUM-BAC™. The results of the viscosity testing is tabulated in Table 5 and shown graphically in FIG. 5.

TABLE 5

Viscosity Reduction Results of a GUM-BAC ™ Microbial
Composition (Non-Encapsulated and Encapsulated) in
a Tap Water Based, Gua Gelled Fluid @ 150° F.

| Time of Evaluation | Sample 1 Control | Sample 2 Control + 0.05 gpt Biocide | Sample 3 Control + 5 gpt GUM-BAC ™ | Sample 4 Control + 5 ppt GUM-BAC ™† |
|---|---|---|---|---|
| 0 hours | 49.0 | 49.0 | 49.0 | 50.0 |
| 2 Days | 41.0 | 41.0 | 40.0 | 41.0 |
| 4 Days | 39.0 | 38.1 | 38.9 | 38.3 |

TABLE 5-continued

Viscosity Reduction Results of a GUM-BAC ™ Microbial
Composition (Non-Encapsulated and Encapsulated) in
a Tap Water Based, Gua Gelled Fluid @ 150° F.

| Time of Evaluation | Sample 1 Control | Sample 2 Control + 0.05 gpt Biocide | Sample 3 Control + 5 gpt GUM-BAC ™ | Sample 4 Control + 5 ppt GUM-BAC ™† |
|---|---|---|---|---|
| 8 Days | 38.1 | 37.0 | 36.6 | 36.8 |
| 11 Days | 38.1 | 37.4 | 37.6 | 37.2 |

†encapsulated

Figure 5:
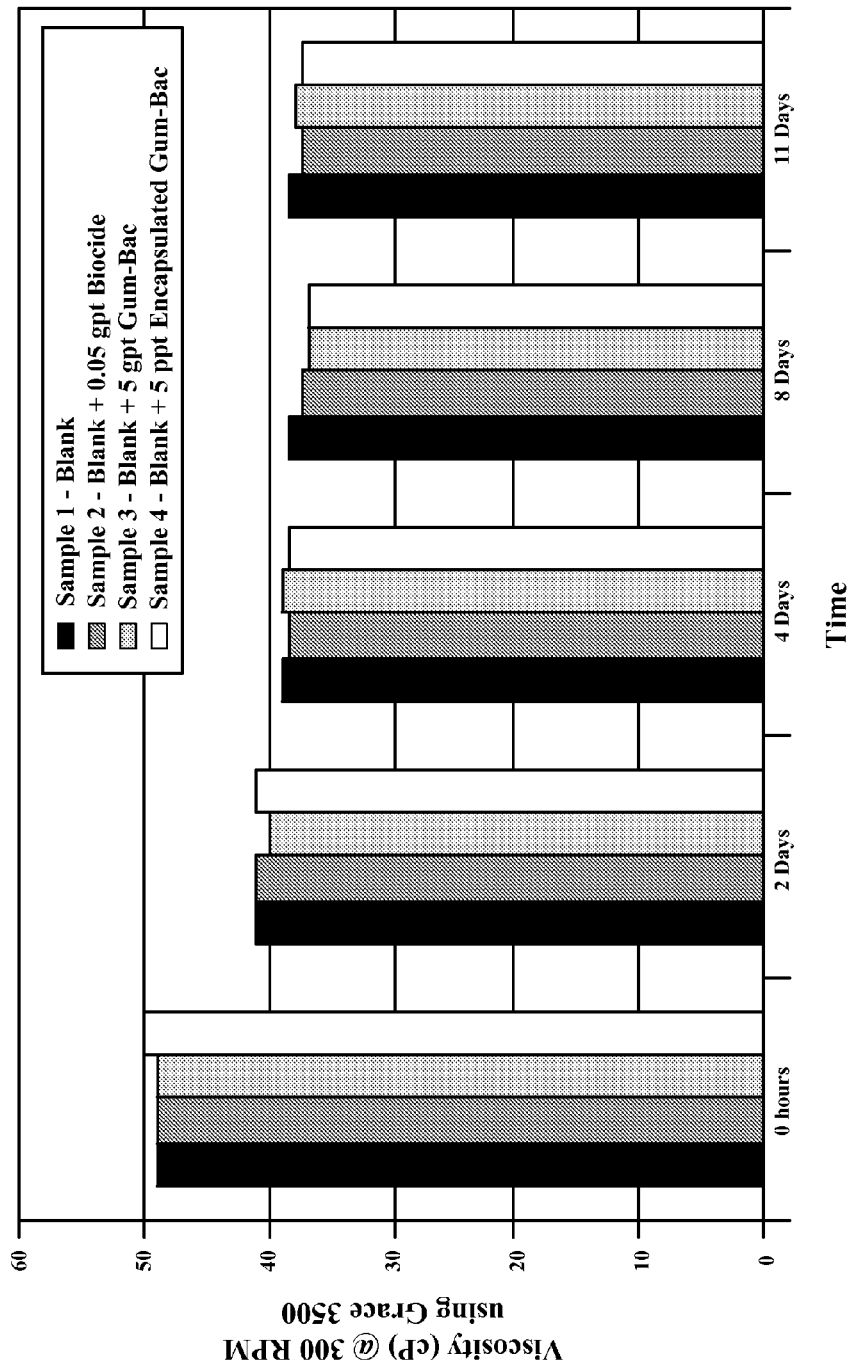
FIG. 5 shows the results of the viscosity reducing effects of an embodiment of a microbial composition, in an unencapsulated and encapsulated form at a pH between about 9.9 and 10.8 in tap water.

Again, it can be seen from the data in Table 5 and in the plot of FIG. 5 that at pH 10, the microbial compositions showed little improvement over the control. Thus, the microbial compositions show some pH sensitivity evidencing higher activity as lower pH.

Example 6

This example illustrates the breaking characteristics of another embodiment of a microbial composition designated G GUM-BAC™ also available from Micro-Bac International, Inc. of Round Rock, Tex. compared to controls at pH 7 and pH 10. The microbial composition is unencapsulated.

Four samples were prepared for this viscosity breaking study. The fluid used in this example was a guar containing gelled fluid. The gelled fluid was formed by mixing 20 pounds of guar per thousand gallons (ppt) in a 2% KCl aqueous solution prepared using San Antonio tap water. The viscosity testing was carried out at a temperature of 150° F. and at a pH of 7.80 and 10.21. The sample 1, designated Blank @ pH7.80, was the gelled fluid itself at pH 7.80, without additives, and served as a pH 7.80 reference or control. The sample 2 designated Blank+5 gpt GUM-BAC™, was prepared as above with the addition of 5 gpt of GUM-Bac also at pH 7.19. The sample 3, designated Blank @ pH 10.21, was the gelled fluid itself at pH 10.21, without additives, and served as a pH 10.43 reference or control. The sample 4, designated Blank+5 gpt GUM-BAC™, was prepared as above with the addition of 5 gpt of GUM-BAC™ at pH 10.21. The results of the viscosity testing is tabulated in Table 6 and shown graphically in FIG. 6.

TABLE 6

Viscosity Reduction Results of a GUM-BAC ™ Microbial
Composition (Non-Encapsulated and Encapsulated) @ 150°
F. In tap Water and using Biocide @ pH 7.8 and 10.21

| Time of Evaluation | Sample 1 Control @ pH 7.80 | Sample 2 Control + 5 gpt GUM-BAC ™ @ pH 7.80 | Sample 3 Control @ pH 10.21 | Sample 4 Control + 5 ppt GUM-BAC ™† @ pH 10.21 |
|---|---|---|---|---|
| 0 hours | 54.9 | 55.4 | 46.4 | 45.8 |
| 3 Days | 7.6 | 8.3 | 9.8 | 9.6 |
| 5 Days | 5.8 | 6.4 | 9.7 | 9.3 |
| 7 Days | 3.8 | 5.9 | 9.7 | 9.0 |

†encapsulated

Figure 6:
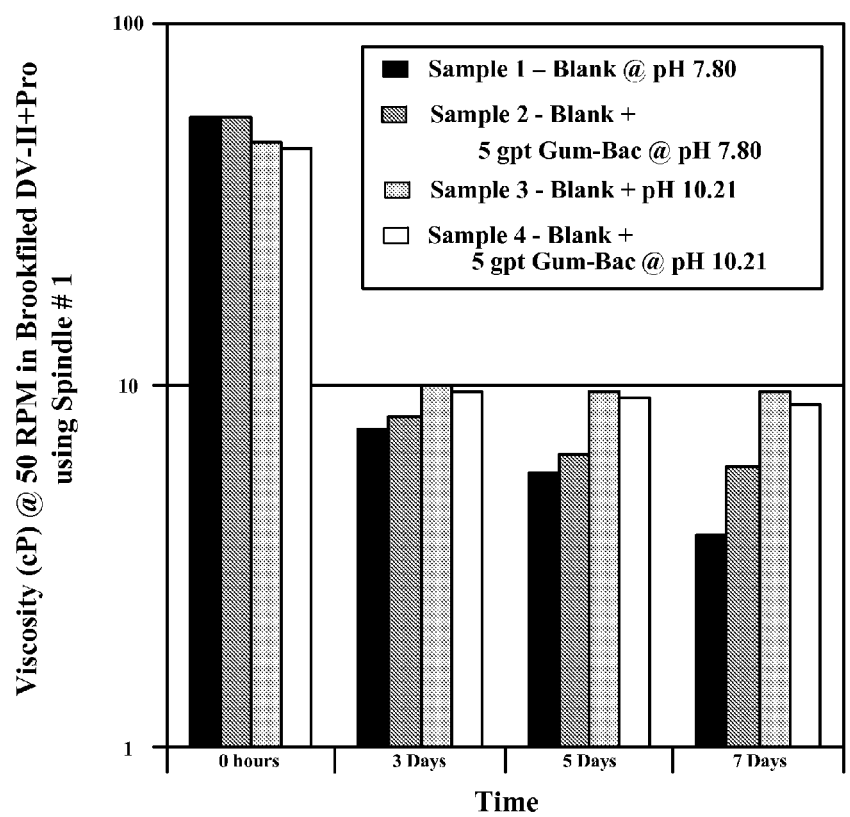
FIG. 6 shows the results of the viscosity reducing effects of another embodiment of a microbial composition, in an unencapsulated and encapsulated form at pH 7 and pH 10 in the presence of BIO-CLEAR® 200 (a registered trademark of Clearwater International, LLC) available from Clearwater International, LLC of Houston, Tex.

Again, it can be seen from the data in Table 6 and in the plot of FIG. 6 that in the presence of a biocide (BioClear 200), the viscosity breaking characteristics of the microbial composition can be neutralized. The above data clearly shows that microbial composition, unencapsulated or encapsulated, can effectively break the viscosity of guar thickened frac fluids in a controlled manner. The data also suggests that by controlling the amount of the compositions in encapsulated form and the amount in unencapsulated form, one can control the rate and profile of viscosity reduction in a guar gelled frac fluid. The data also suggests that an apparatus can be designed that would release the microbes in a sudden form. Such apparatus can include an encapsulating coating designed to breakdown after a specified exposure to a chemical, to temperature, to pressure, and/or to an aqueous environment. The apparatus can also includes a capillary injection method for injecting the active microbial into the formation at a specific time after frac fluid injection into the formation.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A composition for reducing viscosity of a gelled fluid, comprising:
   a first amount of a capsule containing a viscosity reducing microbe disposed within the capsule, and
   a second amount of non-encapsulated viscosity reducing microbe,
   wherein the capsule is adapted to release the viscosity reducing microbe into the gelled fluid over time or in response to a change in a fluid property to release the microbes, where the first and second amounts are adjusted to produce a desired viscosity reduction profile, and where the microbes are selected from the group of hyperthermophilic bacteria and fungi.

2. The composition of claim 1, wherein the change in the fluid property includes changing a temperature of the fluid, exposing the fluid to an aqueous fluid, changing a pH of the fluid, changing a pressure exerted on the fluid, exposing the fluid to shear, exposing the fluid to an additive designed to remove or destroy the capsule, or a combination of some or all of these deencapsulating conditions.

3. The composition of claim 1, wherein the change in the fluid property comprises changing a temperature of the fluid to a temperature sufficient to remove or destroy the capsule.

4. The composition of claim 1, wherein the change in the fluid property comprises exposing the fluid to an aqueous fluid, where the aqueous fluid removes or destroys the capsule.

5. The composition of claim 1, wherein the change in the fluid property comprises changing a pH of the fluid to a pH sufficient to remove or destroy the capsule.

6. The composition of claim 1, wherein the change in the fluid property comprises changing a pressure to a pressure sufficient to remove or destroy the capsule.

7. The composition of claim 1, wherein the change in the fluid property comprises exposing the fluid to shear, where the shear is sufficient to remove or destroy the capsule.

8. The composition of claim 1, wherein the change in the fluid property comprises exposing the fluid to an additive designed to remove or destroy the capsule.

9. An composition for reducing viscosity of a gelled fluid, comprising:
   a first amount of an apparatus comprising:
      an outer shell, and
      an interior filled with a viscosity reducing microbe, and
   a second amount of non-encapsulated viscosity reducing microbe,
   where the outer shell is adapted to rupture in response to a change in a fluid property, where the first and second amounts are adjusted to produce a desired viscosity reduction profile, and where the microbes are selected from the group of hyperthermophilic bacteria and fungi.

10. The composition of claim 9, wherein the change in the fluid property includes changing a temperature of the fluid, exposing the fluid to an aqueous fluid, changing a pH of the fluid, changing a pressure exerted on the fluid, exposing the fluid to shear, exposing the fluid to an additive designed to remove or destroy the outer shell, or a combination of some or all of these deencapsulating conditions.

11. The composition of claim 9, wherein the change in the fluid property comprises changing a temperature of the fluid to a temperature sufficient to remove or destroy the outer shell.

12. The composition of claim 9, wherein the change in the fluid property comprises exposing the fluid to an aqueous fluid, where the aqueous fluid removes or destroys the outer shell.

13. The composition of claim 9, wherein the change in the fluid property comprises changing a pH of the fluid to a pH sufficient to remove or destroy the outer shell.

14. The composition of claim 9, wherein the change in the fluid property comprises changing a pressure to a pressure sufficient to remove or destroy the outer shell.

15. The composition of claim 9, wherein the change in the fluid property comprises exposing the fluid to shear, where the shear is sufficient to remove or destroy the outer shell.

16. The composition of claim 9, wherein the change in the fluid property comprises exposing the fluid to an additive designed to remove or destroy the outer shell.

17. A fluid composition for wellbore operations, comprising:
   an aqueous fluid;
   a fluid thickener;
   a first amount of an unecapsulated viscosity reducing microbe, and
   a second amount of a capsule containing a viscosity reducing microbe,
   where the capsule is designed to release the microbe in response to a change in a fluid property, where the first and second amounts are adjusted to produce a desired viscosity reduction profile, and where the microbes are selected from the group of hyperthermophilic bacteria and fungi.

18. The composition of claim 17, wherein the change in the fluid property includes changing a temperature of the fluid, exposing the fluid to an aqueous fluid, changing a pH of the fluid, changing a pressure, exposing the fluid to shear, exposing the fluid to an additive designed to remove or destroy the encapsulating agent, or a combination of some or all of these deencapsulating conditions.

19. The composition of claim 17, wherein the change in the fluid property comprises changing a temperature of the fluid to a temperature sufficient to remove or destroy the capsule.

20. The composition of claim 17, wherein the change in the fluid property comprises exposing the fluid to an aqueous fluid, where the aqueous fluid removes or destroys the capsule.

21. The composition of claim 17, wherein the change in the fluid property comprises changing a pH of the fluid to a pH sufficient to remove or destroy the capsule.

22. The composition of claim 17, wherein the change in the fluid property comprises changing a pressure to a pressure sufficient to remove or destroy the capsule.

23. The composition of claim 17, wherein the change in the fluid property comprises exposing the fluid to shear, where the shear is sufficient to remove or destroy the capsule.

24. The composition of claim 17, wherein the change in the fluid property comprises exposing the fluid to an additive designed to remove or destroy the capsule.

25. The composition of claim 1, wherein the hyperthermophilic bacteria are selected from the group consisting of *Thermotogas* bacteria, *Bacillus* bacteria, *Citrobacter* bacteria, and *Enterococcus* bacteria.

26. The composition of claim 1, wherein the microbes and fungi are selected from the group consisting of *Thermotoga neapolitana, Thermotoga maritime, Bacillus subtilis, Citrobacter freundii*, and *Enterococcus faecalies*, and *Aspergillus niger*.

27. The composition of claim 9, wherein the hyperthermophilic bacteria are selected from the group consisting of *Thermotogas* bacteria, *Bacillus* bacteria, *Citrobacter* bacteria, and *Enterococcus* bacteria.

28. The composition of claim 9, wherein the microbes and fungi are selected from the group consisting of *Thermotoga neapolitana, Thermotoga maritime, Bacillus subtilis, Citrobacter freundii*, and *Enterococcus faecalies*, and *Aspergillus niger*.

29. The composition of claim 17, wherein the hyperthermophilic bacteria are selected from the group consisting of *Thermotogas* bacteria, *Bacillus* bacteria, *Citrobacter* bacteria, and *Enterococcus* bacteria.

30. The composition of claim 17, wherein the microbes and fungi are selected from the group consisting of *Thermotoga neapolitana, Thermotoga maritime, Bacillus subtilis, Citrobacter freundii*, and *Enterococcus faecalies*, and *Aspergillus niger*.

* * * * *